Sept. 25, 1945.  G. R. BENZ  2,385,489
VALVE ASSEMBLY
Filed June 29, 1937  2 Sheets-Sheet 1
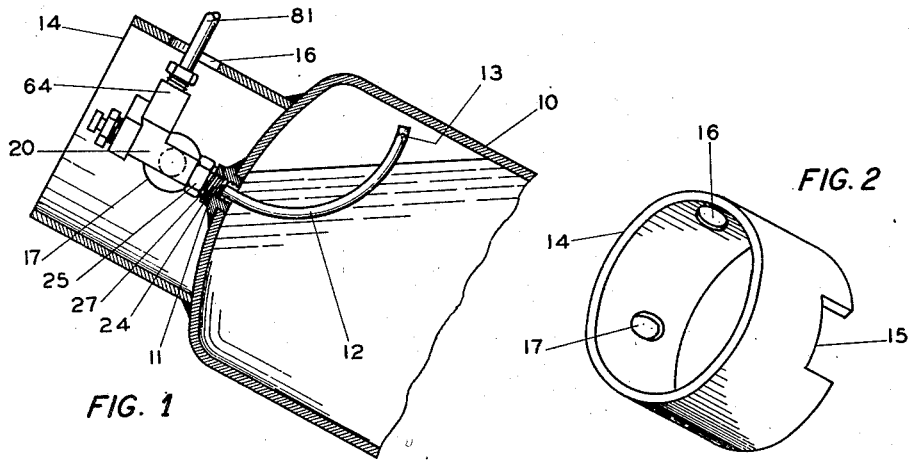
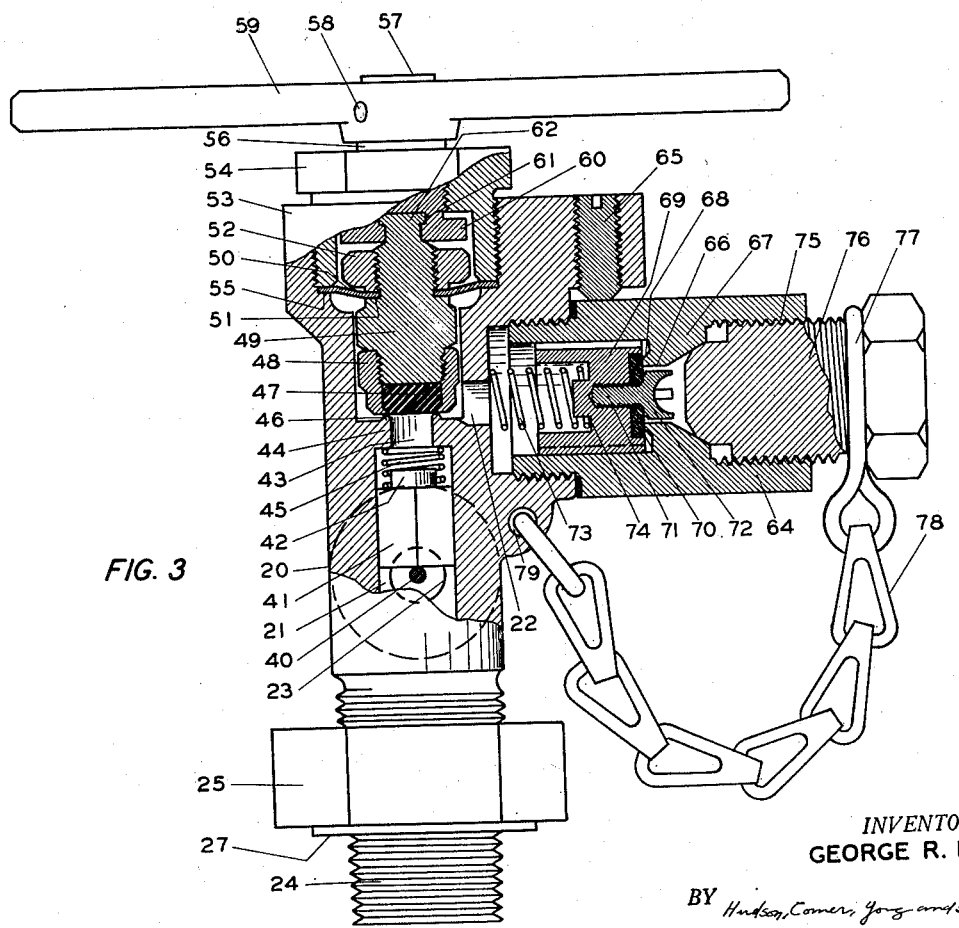
INVENTOR.
GEORGE R. BENZ
BY Hudson, Comer, Young and Shanley
ATTORNEYS.

Sept. 25, 1945.  G. R. BENZ  2,385,489
VALVE ASSEMBLY
Filed June 29, 1937  2 Sheets-Sheet 2

INVENTOR.
GEORGE R. BENZ
BY Hudson, Cramer, Young and Stanley
ATTORNEYS.

Patented Sept. 25, 1945

2,385,489

UNITED STATES PATENT OFFICE 2,385,489

VALVE ASSEMBLY

George R. Benz, Detroit, Mich., assignor to Phillips Petroleum Company, a corporation of Delaware Application June 29, 1937, Serial No. 151,016

5 Claims. (Cl. 277—65)

This invention relates to an improved valve assembly, and more in particular to an improved valve assembly adapted to control the dispensing of fluids, liquids, gases and vapors from containers or vessels of various types, and also adapted for use in filling containers or the like with such fluids.

An object of this invention is to provide an improved valve assembly for containers or vessels of any type, size or construction adapted to control the dispensing of fluids therefrom, and particularly fluids under pressure, and further adapted for filling containers or the like with such fluids.

A further object of this invention is to provide such a valve assembly as above recited having a main dispensing valve and a secondary dispensing valve, and a safety or relief valve and a check valve, and means to protect or guard said valve assembly.

It is to be understood that the improved valve assembly constituting this invention is not to be limited for use with any particular type of vessel or for use with any specific fluid, gas, vapor or liquid, but instead the improved valve assembly hereafter to be described is to be limited in spirit, scope and application solely by the appended claims.

However, for the purpose of describing and illustrating the applications of this invention the valve assembly forming the same will be described in conjunction with a container, of any suitable size and type, which is particularly adapted for containing a fluid under pressure such as liquefied petroleum gas of the type commonly utilized as fuel for industrial and domestic purposes, and which type of fuel in recent years has enjoyed increased approval, acceptance and application for use in the various industries, in rural communities, and due to the compact nature of the apparatus needed for the storage and dispensing thereof, is now meeting with acceptance for use on railroads, boats and the like.

Other objects and advantages of the improved valve assembly will be appreciated from a consideration of the following detail specification, and the attached drawings forming a part thereof, and wherein, Fig. 1 illustrates the valve assembly connected to a container;

Fig. 2 is a perspective view of a guard ring for said valve assembly;

Fig. 3 is a combination side and cross-sectional view of the valve assembly wherein the cross-section portion of the view is taken along the vertical axis of the assembly and shows the main and secondary dispensing valves in seated or closed position;

Figures 4, 5:
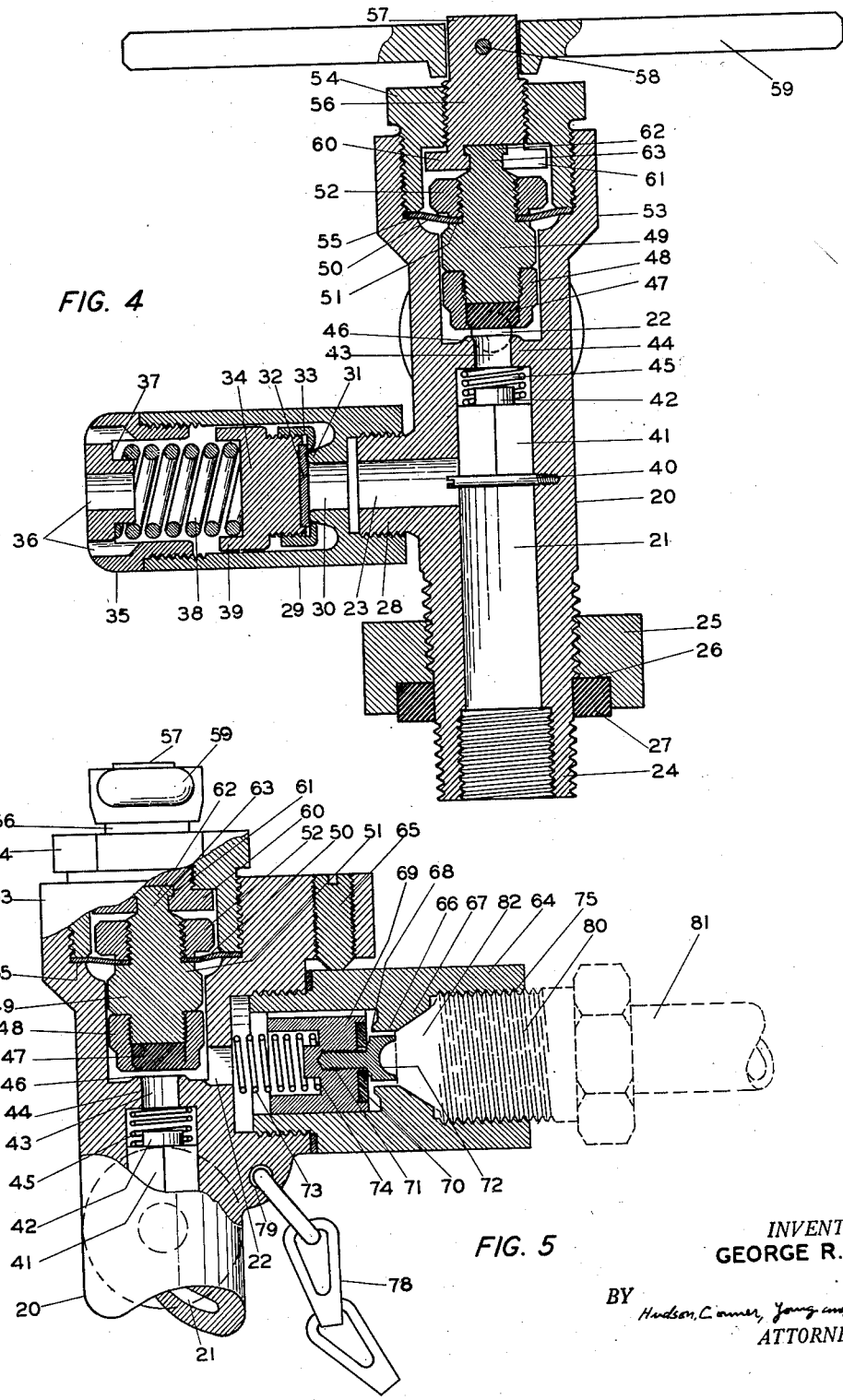

Fig. 4 is a cross-sectional view of the valve assembly illustrated in Fig. 3 and is taken along the line 4—4 of the vertical axis thereof and looking in the direction of the arrows, but with the handle illustrated in Fig. 3 turned 90° to unseat the main dispensing valve; and, Fig. 5 is a cross-sectional view of the valve assembly taken along the vertical axis thereof, as in Fig. 3, but with the handle turned 90° from that illustrated in Fig. 3 to show the main dispensing valve unseated, and a connection made with the secondary dispensing valve to also unseat the same.

With reference now to Fig. 1, therein is illustrated a container, vessel or drum 10 of any suitable type, construction or size, but which preferably is adapted to contain a fluid under pressure such as liquefied petroleum gases such as are used for fuel. Welded or otherwise suitably attached to the top of the container 10 is a boss 11 which is screw threaded internally to receive the screw threaded portion 24 formed on the lower end of the valve assembly casing or housing 20. Screw threaded into the portion 24 of the valve housing is one end of a bent tube 12 which is so formed that the ends thereof lie substantially in planes at right angles to each other, and which tube has one end thereof closed and projecting into the container 10 as shown and formed adjacent the end thereof with a plurality of apertures, such as the one designated by the reference character 13.

The pipe 12 is formed and disposed in the container 10 as described to facilitate the removal and dispensing of vapors or gases only from the container without the accompanying removal therefrom of liquids, when the container is charged with such a fluid under pressure as liquefied petroleum gases, and when the container and valve assembly are used with such gases the container is positively secured in such a position relative to the horizontal, as that shown in Fig. 1, as to positively assure that vapors or gases will surround the aperture 13 of the tube so that only vapors or gases will pass thereinto. The tube 12 is closed at the end, and provided with the apertures 13, to lessen the possibility of liquids splashing or washing into the tube and being withdrawn in lieu of vapors or gases.

Although it is to be understood that in some instances it may be desirable to dispense liquids from the container 10, and in which case the tube 12 is then straightened out or otherwise modified so that it extends below the surface of the container contents to facilitate in withdrawing and dispensing the same.

As illustrated in Fig. 1 a pipe or conduit 81 of any suitable type may be connected to the valve assembly for conveying the contents of the container 10 to the place of their consumption.

Disposed about the valve assembly and securely retained to the top of the container 10 by any approved or desired means, such as by welding, there is positioned the protecting ring or guard 14 to shield the valve assembly against injury. The ring 14, as shown in Fig. 2, has the lower edge or periphery formed with a cut away portion 15 and the walls thereof are provided with the apertures 16 and 17. The cut away portion 15 is provided so as to permit ready access to the valve assembly 20 for the purpose of securing and fastening it into the boss 11 of the container or removing it therefrom, while one of the apertures 16 and 17, such as the one 16 is provided to accommodate the passage of the pipe 81 through the guard ring 14, and the aperture 17 is provided to permit ready access to the relief valve, housed in cylinder 29, and to permit free discharge of vapors therefrom through the aperture 17 when said valve functions, thereby allowing the vapors to escape more readily than if the same were discharged against the inside wall of the protecting ring.

With reference now to Fig. 3 it will be seen that the valve assembly includes a housing or casing 20 having formed therein a main vertical passageway 21 and the horizontal passageways 22 and 23 in communication therewith. The lower end 24 of the casing 20 is both exteriorly and interiorly screw threaded for the purpose of securing the assembly into a container and a boss thereof and for the purpose of retaining a tube such as the one 12 in position, respectively as illustrated in Fig. 1. The valve assembly is further provided with the nut 25 screw threaded on the lower portion thereof and which is formed with the annular groove 26 in which seats the packing ring 27 by virtue of which nut and packing a tight fluid proof connection is made between the valve assembly and the container with which it is used, as is illustrated in Fig. 1.

The valve assembly includes a main safety relief valve which is secured to the externally screw threaded boss 28 formed on one side of the valve casing 20 and in which is formed the horizontal port 23 and to which boss is screw fitted one end of the cylinder 29 formed with the port 30 in communication with said last port, and further formed with the valve seat portion 31 adapted to normally seat against a valve disc 32 retained by the nut 33 to the valve plug 34 which is slidable within the cylinder 29. The other end of the cylinder 29 is closed by the screw plug 35 formed with a plurality of apertures 36 and the guide 37 to accommodate one end of the spring 38, the other end of which rests within the guide 39 of the valve plug 34. Thus the spring 38 serves to normally retain the safety relief valve disc 32 in contact with the valve seat 31 and so maintain the port 30 closed. However, whenever any undue or abnormal pressure is present in the passageways 21, 23 and 30 the same will overcome the action of spring 38 and force the disc 32 from the seat 31, and thus put passageways 21 and 23 and ports 30 and 36 in communication, as will be more fully explained hereafter.

Within the vertical passageway 21 of the valve body 20, and opposite the port 23, there is located a pin 40 screwed into the wall of the said passageway and positioned transversely thereof, and which is accessible through the port 23 when the cylinder 29 is removed. Above said pin and seated thereon is positioned a square, or other polysided, slug 41 which serves as an excess flow valve and is formed with the cylindrical head 42 which is of a slightly less diameter than the port 43 thereabove formed in the restriction 44 of the passageway 21. One end of a coil spring 45 fits over the cylindrical head 42 and rests against the upper surface of the slug 41 while the other end of the spring makes contact with the under side of the restriction 44 and so serves to normally maintain the slug 41 in the position illustrated with the cylindrical head 42 thereof removed from the port 43 and the same free for passage therethrough.

In the event any undue increase in flow upwardly through the passageway 21 occurs which is above the normal increase therein, such as may be caused by the main valve seat 46 and the secondary valve seat 68 both being open with no connecting conduit such as the one 81, illustrated in Fig. 5 connected to the latter, resulting in a pressure differential in passageway 21 greater than that for which the excess flow valve, comprising the slug 41 and spring 45, is designed, then said pressure differential will overcome the action of spring 45 and tend to force the slug 41 upwardly thereagainst until the cylindrical head 42 enters the port 43 thereby closing the same. Thus an excess flow is provided, the further function and operation of which will hereinafter be described.

The restriction 44 is provided on the upper side thereof with a valve seat 46 against which is adapted to rest the valve disc 47 retained by the nut 48 upon the lower end of a valve body 49 which is reciprocably mounted in the upper end of the valve casing, and when the valve disc 47 is upon the seat 46 as illustrated in Fig. 3 the port 43 is securely closed against passage therethrough. The valve seat 46 and the disc 47 adapted to close the port 43 constitute the main dispensing and filling valve through which the container contents are both emptied and charged.

A flexible diaphragm or disc 50, which may be formed of thin metal or other suitable material, is mounted upon a shoulder 51 of the valve body 49 and secured in place by the nut 52, as shown in Fig. 3. In Fig. 4 the valve disc 47 is illustrated unseated from the valve seat 46 leaving port 43 open, and reference will now be had to this view for a clearer description of this valve and the manner by which it is operated. It will be seen that the upper part of the valve casing comprises an enlarged flared portion or top 53 into which is screw fitted the bonnet nut 54 which holds the diaphragm in place upon the shoulder 55 formed on the interior of the valve casing top.

Screw fitted into the bonnet nut 54 is a stem 56 provided with the head 57 upon which, by virtue of the pin 58, is retained the handle 59. The lower part of stem 56 is formed with a disc 60 in which is formed a channeled slot 61, as shown in Figs. 4 and 5, in which seats the head 62 formed on the neck 63 of the valve body 49.

Thus it will be seen that by rotating the handle 59 the stem 56 will rotate within the nut 54 and ride up or down on the screw threads internally thereof in accordance with which way the handle is turned, and in so riding up or down will either push down or pull up on the valve body 49 by virtue of the connection between the head 63 thereof and the slot 61 formed in the disc 60 of the stem 56.

For instance, in Fig. 3 the handle 59 has been turned so as to screw the stem 56 into the gland 54 and thereby force the valve body 49 downwardly, as has been described, until the valve disc 47 is forced to rest upon the valve seat 46 thereby sealing port 43, whereas in Fig. 4 the handle 59 has been turned 90° to the left from that shown in Fig. 3 with the result that the stem 56 has been partially screwed out of the bonnet nut 54 with the resultant raising of the valve body 49 and unseating of the disc 47 from the seat 46 to open the port 43 and permit passage therethrough and into port 22, which last mentioned port is more clearly illustrated in Figs. 3 and 5.

The diaphragm 50 is provided and securely retained on the shoulder 55 by the gland nut 54 as described to prevent the escape of fluid through the port 43 in any direction other than through the port 22. That is to say, the diaphragm seals the upper end of the valve casing against fluid passing upwardly through port 43 and into the top of the valve casing and past the bonnet nut 54.

Screw fitted into the side of the valve casing 20, and opposite the port 22 formed therein, there is provided a cylindrical fitting 64, retained in position with respect to said valve casing by the screw 65, in which is disposed a secondary dispensing and filling valve, and which is formed with port 66 in a restriction 67 thereof, and having a valve seat 68. A poly-sided slidable valve plug 69 is disposed within said cylindrical fitting 64 and is provided with a valve disc 70 retained in place by the screw 71 provided with the recessed head 72. One end of a coil spring 73 seats adjacent the port 22 and the other end seats in the valve guide 74 formed in the valve body 69 and serves to normally retain the disc 70 in contact with the seat 68 and thus keep port 66 closed.

The cylindrical fitting 64 is open at one end, and is internally screw threaded as designated by the reference numeral 75 into which threads fits a screw threaded stopper 76 provided with a ring 77 about the neck thereof which is connected to a chain 78 secured to the valve casing 20 at the point 79 to prevent the misplacement of the stopper when the same is removed as shown in Fig. 5.

When the valve assembly is connected to a container and the contents thereof, such as liquefied petroleum gases, are not being dispensed, but instead the container is merely being stored or transported, then it will be advisable to position the stopper 76 as illustrated in Fig. 3, for in such position the stopper guards and prevents the opening of the valve controlling port 66. However when it is desired to open port 66 and dispense the contents from the container the stopper 76 is removed and a screw threaded coupling 80, as illustrated in Fig. 5 and which may be connected to any suitable pipe or tubing 81, provided with a conical shaped head 82 is screwed into the cylindrical fitting 64 until the head 82 thereof contacts the recessed head 72 formed on the screw 71 and by further inserting the coupling 80 and the head 82 thereof into the cylindrical fitting the disc 70 is forced off of the seat 68 thereby opening the port 66 and permitting flow of fluid from the container through the tube 12, passageway 21, port 43, port 22 and port 66 and so through the coupling 80 and into the pipe 81 and thence to any desired place for the consumption of the container contents.

Thus it will be seen that when the valve assembly above described is used in conjunction with a container of a fluid under pressure, such as liquefied petroleum gases, and the fluid is not desired to be withdrawn therefrom, then the stopper 76 will be inserted in the cylindrical fitting 64 to guard the secondary dispensing and filling valve disposed therein, which will be closed by virtue of the spring 73 forcing the disc 70 against the seat 68 to seal port 66, and under such conditions the handle 59 will be so turned as to cause the valve body 49 to retain the disc 47 in contact with the seat 46 to seal port 43 of the main dispensing and filling valve, and at the same time the main relief valve will be closed by virtue of spring 38 forcing the disc 32 against seat 31 to seal port 30.

With the various parts of the valve assembly in the positions above described, there will be no escape of fluid therethrough or therefrom. However when it is desired to withdraw a fluid, such as one under pressure, from the container the stopper 76 is first removed and the coupling 80 inserted in the cylindrical fitting 64 to open the secondary dispensing and filling port 66 as has been described. However even when port 66 is opened there will be no escape of fluid into pipe 81 as port 43 is still closed by the disc 47, so after a satisfactory connection has been made between the cylindrical fitting 64 and the coupling 80 and so opening port 66, then the handle 59 may be turned in the proper direction to rotate the valve body 49 raising the same together with the disc 47 and thus unseating it from the main valve seat 46 to open port 43 and render the vapors, gases or liquid within the container 10 free to flow into the apertures 13 and through tube 12 into passageway 21 and through ports 43, 22 and 66 into the pipe 81 from whence they are conveyed by any suitable conduit to their place of consumption.

When the stopper 76 is in place or when such removal of the contents of the container 10, which are assumed to be under pressure, is accomplished as described under normal conditions, the port 30 will be closed, but if from any cause the pressure within the container 10, or the tube 12 and the passageway 21 immediately connecting therewith, increases above normal or materially above normal to the point where an explosion or other dangerous conditions may be imminent, then such danger will be alleviated as the abnormal pressure will overcome the force of spring 38 and act to unseat the disc 32 from the seat 31 and so open port 30 and allow the fluid in passageway 21 under abnormal pressure to escape through the ports 36. When the danger from abnormal pressure no longer exists, due to the escape of fluid through ports 36, the spring 38 will reseat the disc 32 upon the valve seat 31 and so close the port 30 against further escape of fluid.

And if, while the coupling 80 is connected to the cylindrical fitting 64 to withdraw fluid through the conduit 81, any disruption of conduit 81 occurs which would increase the flow therethrough above normal together with an increase of fluid flow above normal through passageway 21, or if such abnormal fluid flow in passageway 21 is caused for any reason, then the same by virtue of its increased pressure differential will overcome the force of spring 45 and force the slug 41 upwardly until the head 42 thereof seats in the port 43 and closes the same against fluid flow therethrough and the resultant loss of the fluid. And when said abnormal conditions cease the spring 45 will force the slug 41 downwardly into its normal position to unseal port 43.

When it is desired to fill the container 10 the stopper 76 is removed and any suitable connection or coupling such as the one 80 is inserted in the fitting 64 and with the port 43 retained unsealed the container can conveniently be filled.

The guard ring 14 when secured to the container 10 as illustrated in Fig. 1 serves to protect the valve assembly and yet does not hinder the use thereof or access thereto, for it will be noted that the conduit 81 and coupling 80 are readily passable through the aperture 16 for connection with the fitting 64. And by virtue of the cut away portion 15 of the ring 14 access is readily had to the valve assembly and particularly to the nut 25 thereof for the purpose of securing the assembly to the container 10, and by virtue of aperture 17 access is had to the pressure relief valve encased within the cylinder 29 and it is through this aperture 17 that free discharge of vapors are permitted when the relief valve is open.

I claim:

1. An improved valve assembly for controlling fluid flow, comprising a passageway adapted to communicate at one end with the interior of a container, a control valve at the other end of the passageway for closing the same, a pressure relief valve communicating with the passageway at a point intermediate said ends and an excess flow valve in the passageway between said control valve and said point.

2. An improved valve assembly for controlling fluid flow, comprising a valve casing having a main passageway communicating at one end with a container, a valve for closing the other end of the passageway, a port in the passageway intermediate the ends, an excess flow valve in the passageway between the port and the valve, and a support for the excess flow valve, accessible through the port.

3. An improved valve assembly for controlling fluid flow, comprising a valve casing having a main passageway adapted to communicate at one end with the interior of the container, the opposite end of said passageway communicating with the consumer's service line, a valve seat in the passageway intermediate the ends, an excess flow valve in the passageway disposed adjacent the valve seat, a control valve in said passageway for closing the same, and a pressure relief valve located in said passageway at a point between the control valve and the tank.

4. An improved valve assembly for controlling fluid flow, comprising a valve casing having a main passageway adapted to communicate at one end with the interior of the container, the opposite end of said passageway communicating with the consumer's service line, a valve seat in the passageway intermediate the ends, an excess flow valve in the passageway disposed adjacent the valve seat and urged in an opposite direction to fluid flow by means of a compression spring, a control valve in said passageway for closing the same, and a pressure relief valve located in said passageway at a point between the control valve and the tank.

5. An improved valve assembly for controlling fluid flow, comprising a valve casing having a main passageway adapted to communicate at one end with the interior of the container, the opposite end of said passageway communicating with the consumer's service line, a control valve in said passageway for closing the same, a pressure relief valve located in said passageway at a point between the control valve and the tank, and an excess flow valve located on the downstream side of the pressure relief valve.

GEORGE R. BENZ.